June 9, 1964  A. A. FOWLER, JR., ETAL  3,135,998
FLUID PRESSURE OPERATED PRESS
Filed Nov. 3, 1960  3 Sheets-Sheet 1

INVENTORS
Aubrey A. Fowler, Jr.
Henry O. McKee

BY

ATTORNEY

June 9, 1964 A. A. FOWLER, JR., ETAL 3,135,998
FLUID PRESSURE OPERATED PRESS
Filed Nov. 3, 1960 3 Sheets-Sheet 2
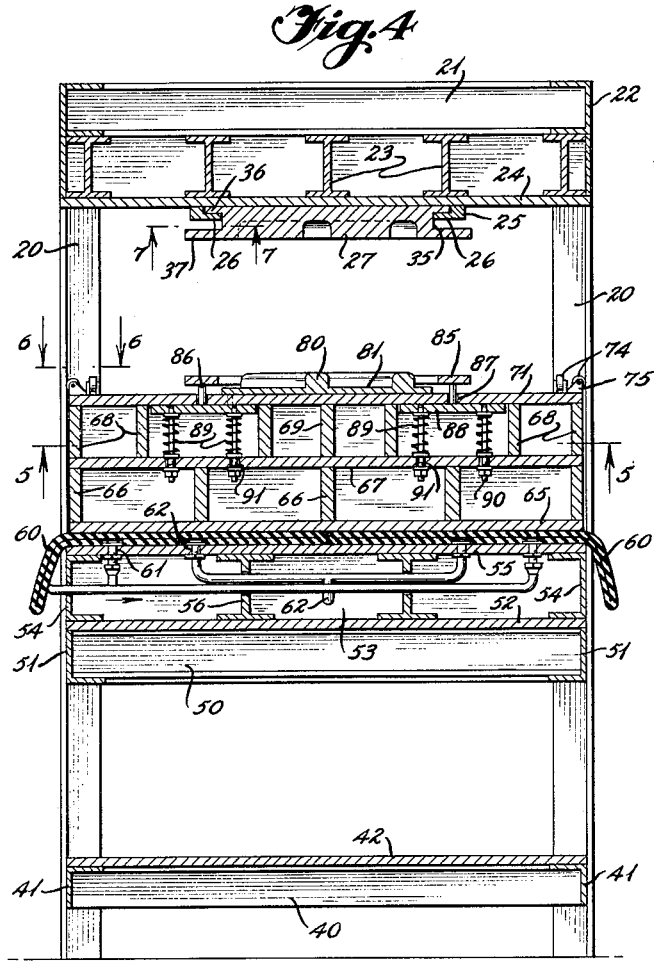
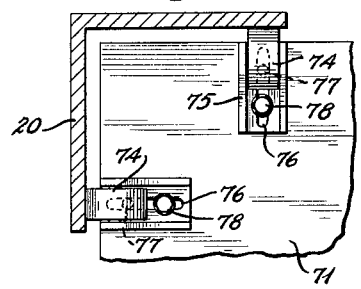
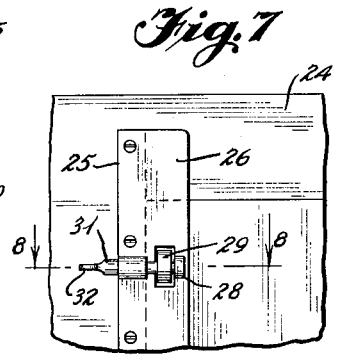
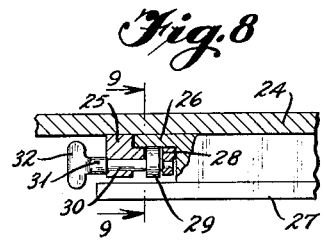
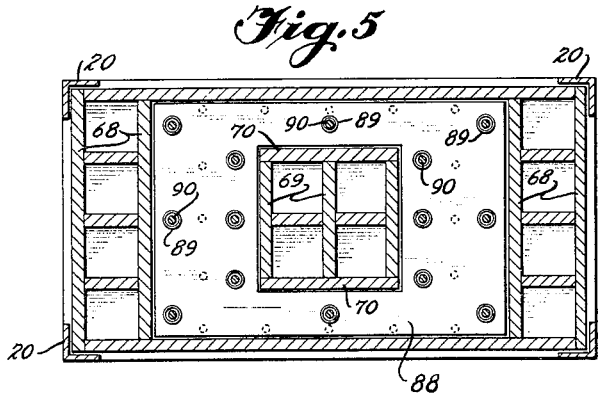
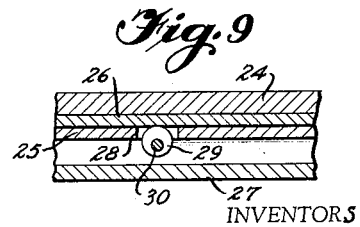
INVENTORS
Aubrey A. Fowler, Jr.
Henry O. McKee
BY
ATTORNEY June 9, 1964 A. A. FOWLER, JR., ET AL 3,135,998
FLUID PRESSURE OPERATED PRESS
Filed Nov. 3, 1960 3 Sheets-Sheet 3
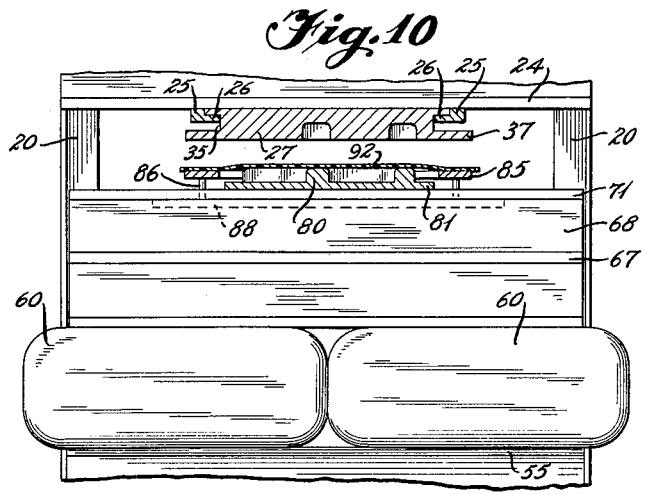
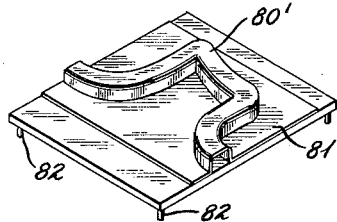
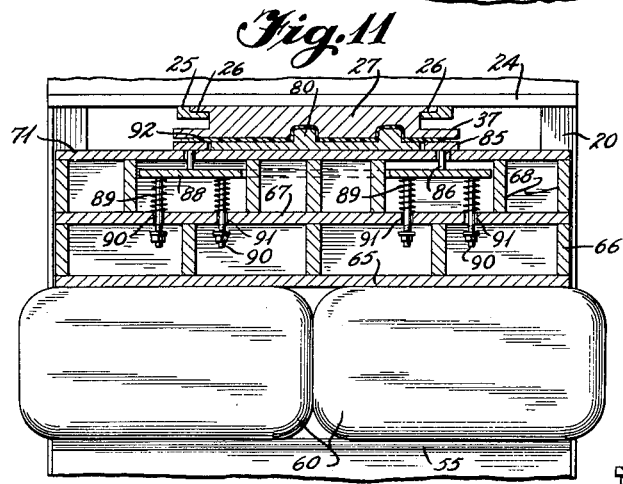
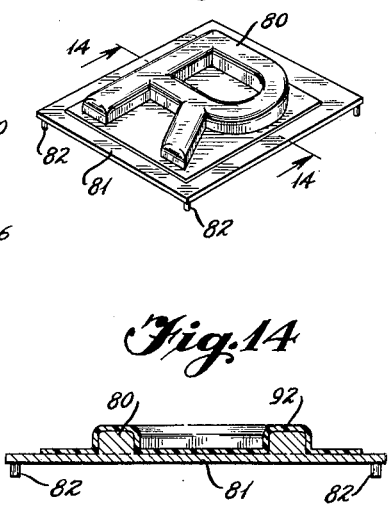
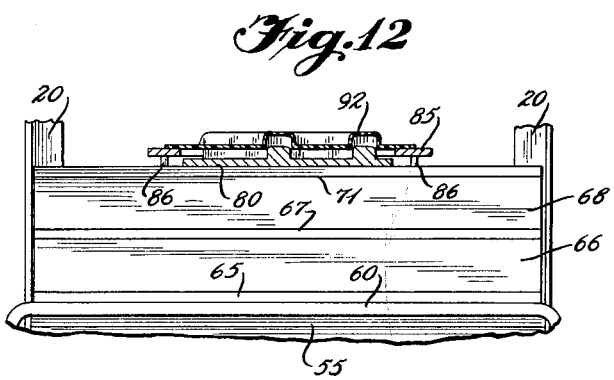
INVENTORS
Aubrey A. Fowler, Jr.
Henry O. McKee
BY
ATTORNEY United States Patent Office 3,135,998
Patented June 9, 1964

3,135,998
FLUID PRESSURE OPERATED PRESS
Aubrey A. Fowler, Jr., Box 443, and Henry O. McKee, 203 Morro St., both of Fairmont, N.C.
Filed Nov. 3, 1960, Ser. No. 67,039
2 Claims. (Cl. 18—19)

This invention relates to the forming or molding of commodities including both the molds and the mechanism by which the molds are subjected to pressure in the forming process in the production of certain products.

The invention relates particularly to a press having a flexible container which can be subjected to internal pressure for expanding the same and in which subsequently the pressure can be released to permit the container to collapse.

Difficulty has been experienced in obtaining uniform pressure over all portions of the contacting surfaces of the press and efforts to overcome this difficulty has met with only limited success resulting in needless waste of materials, time and effort, as well as the obtaining of results satisfactory only to a limited degree.

It is an object of the invention to provide a relatively large strong light weight self-contained press utilizing one or more fluid containers to insure the application of uniform pressure over the area of the press as well as a source of such pressure and a control for the introduction and release of such pressure.

Another object of the invention is to provide an upright relatively inexpensive and compact press employing flexible fluid container means for the application of pressure uniformly over a given area and with an adjustable spring tensioned press ring for holding the material during the pressing of the same in a manner that such material can move during the initial pressing or forming but will be stationary during the final stages in such operation.

Another object is to provide a simple inexpensive press for use with cooperating male and female mold members to form relatively large individual characters for use as on advertising signs.

Figure 1:
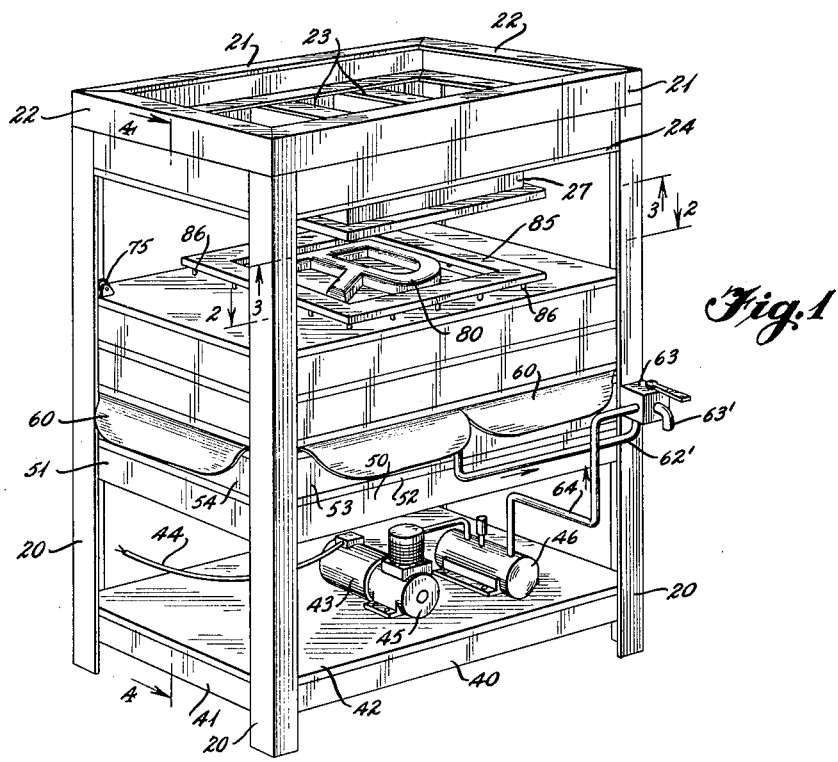
Figure 2:
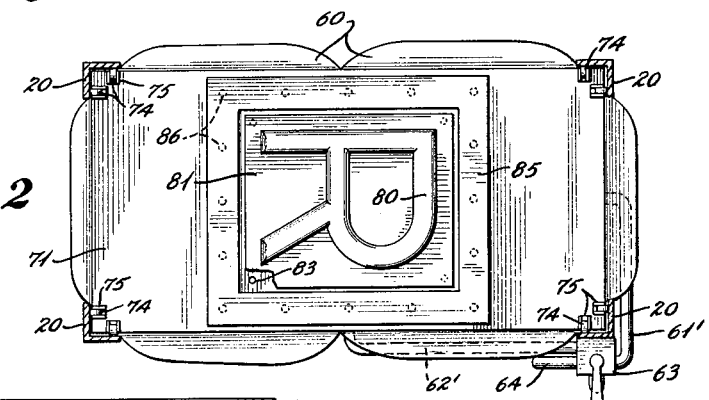
Figure 3:
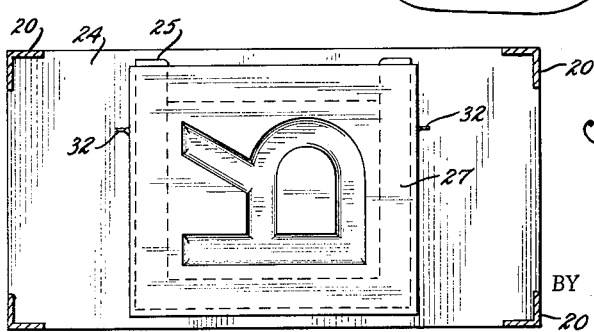

Other objects and advantages of the invention will be apparent from the following description taken in conjunction with the accompanying drawings, in which:

FIG. 1 is a perspective view illustrating one application of the invention;

FIG. 2, an enlarged horizontal section on the line 2—2 of FIG. 1;

FIG. 3, an enlarged horizontal section on the line 3—3 of FIG. 1;

FIG. 4, an enlarged vertical section on the line 4—4 of FIG. 1;

FIG. 5, a transverse section on the line 5—5 of FIG. 4;

FIG. 6, an enlarged fragmentary detail of the corner post and associated parts;

FIG. 7, a section on line 7—7 of FIG. 4;

FIG. 8, a section on the line 8—8 of FIG. 7;

FIG. 9, a section on the line 9—9 of FIG. 8;

FIG. 10, an enlarged fragmentary detail of the mold with the flexible container partially filled;

FIG. 11, a similar view with the container completely filled;

FIG. 12, a similar view after formation and the flexible container collapsed;

FIG. 13, a perspective of the male mold with the formed article thereon;

FIG. 14, a section of the molded article on the line 14—14 of FIG. 13; and

FIG. 15, a perspective of a modified form of the male mold.

Briefly stated, the invention is a simple and inexpensive strong, compact, relatively large, lightweight and generally rectangular press having fixed and movable press members within a frame of four corner posts and the movable member comprising a floatable press member or platen actuated by one or more flexible containers with means for supplying fluid pressure to exert the desired force against the movable member of the press to perform the desired pressing and forming process. The movable member of the press is provided with a resiliently mounted press ring for holding the work during the forming operation and permitting the material held to flow into the cavities of the mold during the initial stages and to be held fixed during the final stages. A pump is provided for forcing fluid under pressure into an accumulator, and a line is provided from the accumulator to the flexible container with a control valve in such line, and with a discharge line from such container controlled by such valve. The movable member of the mold likewise is provided with guide means for preventing its jamming in its mounting.

With continued reference to the drawings, the present invention comprises a press having legs 20 connected at their upper ends by front and rear cross members 21 and side cross members 22. The cross members 21 are connected by a plurality of reinforcing I-beams 23 and such I-beams support an upper mold mounting plate 24.

The plate 24 has a generally U-shaped mold retainer 25 fixed to the bottom thereof in such a manner that the legs 26 of such retainer project inwardly towards the center of the machine and are undercut to form a slideway or holder for a female mold 27.

The bracket 25 may have a cut-out portion 28 (FIG. 8) in each of its legs for the reception of a cam 29 mounted on a shaft 30 having an enlarged portion 31 and an operating handle 32 and such cam is adapted to clamp the female mold in position. The female mold 27 has a recessed portion 35 which provides an upper flange 36 and a lower flange 37 with the upper flange being adapted to slide in the slideway of the retainer 25 to lock the female mold in fixed position.

The legs 20 (FIG. 1) are connected at their lower ends by front and rear angular cross braces 40 and side angular cross braces 41 and such cross braces support a platform 42. The platform 42 is adapted to support a motor 43 to which electrical energy is supplied through a conduit 44 and such motor drives a compressor 45 to supply fluid such as air under pressure to an accumulator 46.

A stationary platform is provided intermediate the ends of the legs 20 and comprises front and rear angular cross braces 50 and side cross braces 51 which support a platform 52. The platform 52 is connected to front and rear cross members 53 and side members 54 which support a platform 55. Intermediate braces 56 (FIG. 4) are located between the platforms 52 and 55 to provide additional support. The platform 55 supports one or more collapsible fluid containers 60 having one or more inlets 61 and outlets 62 for the admission and exhaust of pressure fluid. A three-way valve 63 of known construction is mounted on one of the legs 20 and is connected to the accumulator 46 by a fluid line 64. An inlet pipe 61' connects the valve 63 with the inlet 61 and an exhaust line 62' connects the valve 63 with the outlet 62 to exhaust fluid pressure from the containers 60 through a discharge 63'.

A floating or movable platform rests on the collapsible container and comprises a bottom plate 65 connected by a plurality of transverse reinforcing members 66 to an intermediate plate 67. The plate 67 has a pair of upwardly extending reinforcing members 68 located adjacent each end of the intermediate platform 67 and reinforcing members 69 are located centrally of the platform 67. The reinforcing members 69 are somewhat shorter than the reinforcing members 68 and are connected by front and rear reinforcing members 70 (FIG. 5) to form a generally rectangular hollow area and the reinforcing members 68 and 69 support a platen or platform 71.

A pair of adjustable rollers 74 mounted on brackets 75 are provided at each corner of the platform 71 and the bottom of each of the brackets has a slot 76 in which is received a guide pin 77 and a screw or other fastener 78 which may be loosened to permit longitudinal adjustment of the brackets 75 so that the rollers 74 contact the inside of the legs 20, to guide the platform 71, whereupon the fasteners 78 are tightened to maintain the brackets in fixed position.

A male mold 80 is mounted on a mold board 81 connected to the platform 71 in any desired manner. Such mold board (FIGS. 2 and 13) preferably has locating pins 82 projecting downwardly and such pins are received in openings 83 (FIG. 2) in the platform 71.

A press ring 85 is provided exteriorly of the male mold 80 and comprises a generally hollow rectangular plate supported on pegs 86 which extend downwardly through openings 87 in the plate 71 and are secured to a floating plate 88 thereunder. The floating plate 88 is supported on springs 89 which extend between the floating plate 88 and the intermediate plate 67 of the frame and are maintained in position by bolts and nuts 90 which are connected to the floating plate 88 and project downwardly through the springs 89 and through openings 91 in the intermediate platform 67 for a purpose later to be described.

The cooperating male and female molds may be of any desired configuration as for example in the production of an advertising sign. FIG. 13 illustrates an individual male mold in the form of a capital R shown in block letters. It is noted that the letters are relatively large, in the range of 3 feet by 4 feet, although the invention is not limited to any particular size. If desired the cooperating male and female molds may be formed in individual lower case or script as illustrated in FIG. 15. In order to do this the mold 80' extends from a predetermined position at one edge of the mold board 81 to a predetermined position at the opposite edge thereof so that the beginning and end of a letter will be in alignment with any previous letter and any subsequent letter.

In the operation of the device a female mold 27 is placed in the bracket 25 and locked in position by the cam 29 and a cooperating male mold 80 is mounted on the platform 71. A sheet of plastic 92 (FIGS. 10-14) or other material of which the sign is to be made is heated to approximately 320° and is then placed over the male mold, the plastic sheet being of such size that it overlies and extends beyond the edge of the press ring 85. When fluid pressure is applied to the collapsible containers 60 the floating platform on which the male mold is mounted will be raised so that the male mold will enter the female mold and the press ring will resiliently clamp the plastic sheet against the flange 37 of the female mold. Continued upward pressure will form the plastic sheet between the male and female molds. During the initial forming process the small amount of pressure on the press ring will permit the plastic sheet 92 to be drawn inwardly to fill the cavity in the female mold. Continued upward movement of the floating platform will create progressively greater tension on the press ring 85 and the plastic sheet 92 due to the ring being pushed down against the floating plate 88 and such plate will be under progressively greater pressure from the springs 89. This process prevents the formation of wrinkles in the plastic because the plastic sheet 92 is firmly held during the latter portion of the forming process. After the plastic 92 has been formed around the male mold the fluid pressure is released from the collapsible container 60 and the floating platform will gravitate downwardly to separate the male and female molds. As the molds separate, springs 89 will again push the floating plate 88 upwardly and the press ring thereon will separate the plastic from the male mold for easy removal.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A press for molding plastic sheets comprising frame structure, opposed fixed and movable mold members in said frame structure and having complementary portions, mounting structure for said opposed mold members including fixed and pressure resisting transversely disposed reinforcing members, a support backed by said reinforcing members for said fixed mold member including spaced parallel retaining means by which said fixed mold member is adapted to be held in place, a support for said movable mold member comprising top, intermediate, and bottom members, and spaced connecting reinforcing members between said top and intermediate members defining a generally rectangular hollow structure, a press ring outside said hollow structure and in cooperative relation with said movable mold member, yieldable means within said generally rectangular structure, and connecting means extending therefrom and supporting said press ring.

2. The structure of claim 1 in which said spaced parallel retaining members define flanges and cam means for binding said flanges between said mold member and said flanges.

References Cited in the file of this patent
UNITED STATES PATENTS

| | | |
|---|---|---|
| 1,760,288 | Stevens | May 27, 1930 |
| 1,958,076 | Vincent | May 8, 1934 |
| 1,994,278 | Halsall et al. | Mar. 12, 1935 |
| 2,148,704 | Merritt | Feb. 26, 1939 |
| 2,190,807 | Steinberger | Feb. 20, 1940 |
| 2,411,043 | Klassen | Nov. 12, 1946 |
| 2,624,296 | Nuttall | Jan. 6, 1953 |
| 2,666,951 | Grove et al. | Jan. 26, 1954 |
| 2,869,173 | Van Hartesveldt et al. | Jan. 20, 1959 |